US007978858B2

(12) United States Patent
Osajima et al.

(10) Patent No.: US 7,978,858 B2
(45) Date of Patent: Jul. 12, 2011

(54) TERMINAL DEVICE, GROUP MANAGEMENT SERVER, NETWORK COMMUNICATION SYSTEM, AND METHOD FOR GENERATING ENCRYPTION KEY

(75) Inventors: Ikuko Osajima, Yokohama (JP); Nobuyuki Ikeda, Fuchu (JP); Akira Suzuki, Fuchu (JP); Shinji Ogishima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 772 days.

(21) Appl. No.: 12/059,183

(22) Filed: Mar. 31, 2008

(65) Prior Publication Data

US 2009/0060189 A1 Mar. 5, 2009

(30) Foreign Application Priority Data

Jun. 26, 2007 (JP) ................... 2007-167519

(51) Int. Cl.
*H04L 29/06* (2006.01)
*H04L 9/00* (2006.01)
*H04L 9/08* (2006.01)
(52) U.S. Cl. ......... 380/277; 380/278; 380/279; 713/162
(58) Field of Classification Search .................. 380/277, 380/278, 279; 713/162
See application file for complete search history.

(56) References Cited

U.S. PATENT DOCUMENTS

| | | | | |
|---|---|---|---|---|
| 6,832,314 B1* | 12/2004 | Irvin | ............................. | 713/162 |
| 7,599,496 B2* | 10/2009 | Hengeveld et al. | ........... | 380/278 |
| 7,860,255 B2* | 12/2010 | Nonaka et al. | ................ | 380/279 |

FOREIGN PATENT DOCUMENTS

JP 2005-159780 6/2005

OTHER PUBLICATIONS

A lower bound for multicast key distribution; Snoeyink, J.; Suri, S.; Varghese, G.; INFOCOM 2001. Twentieth Annual Joint Conference of the IEEE Computer and Communications Societies. Proceedings. IEEE vol. 1; Publication Year: 2001 , pp. 422-431 vol. 1.*
SeGCom: A secure group communication mechanism in cluster-tree wireless sensor networks Gaddour, O.; Koubaa, A.; Abid, M.; Communications and Networking, 2009. ComNet 2009. First International Conference on Publication Year: 2009 , pp. 1-7.*
Scalable Secure Bidirectional Group Communication Yitao Duan; Canny, J.; INFOCOM 2007. 26th IEEE International Conference on Computer Communications. IEEE Publication Year: 2007 , pp. 875-883.*

* cited by examiner

*Primary Examiner* — David Y Jung
(74) *Attorney, Agent, or Firm* — Oblon, Spivak, McClelland, Maier & Neustadt, L.L.P.

(57) ABSTRACT

A network communication system has terminal devices belonging to a group, the terminal devices generating, if there is a leaving terminal device leaving from the group, an updated group encryption key corresponding to a new group encryption key, from a deletion key corresponding to the leaving terminal device and a group encryption key, and, after the leaving terminal device leaves the group, communicating by using the updated group encryption key; and a group management server generating the updated group encryption key corresponding to the new group encryption key from the deletion key corresponding to the leaving terminal device and the group encryption key, and, after the leaving terminal device leaves the group, communicating by using the updated group encryption key.

9 Claims, 7 Drawing Sheets

TERMINAL DEVICE, GROUP MANAGEMENT SERVER, NETWORK COMMUNICATION SYSTEM, AND METHOD FOR GENERATING ENCRYPTION KEY

The present disclosure relates to subject matters contained in Japanese Patent Application No. 2007-167519 filed on Jun. 26, 2007, which are expressly incorporated herein by reference in its entireties.

BACKGROUND OF THE INVENTION

1. Field of the Invention

The present invention relates to a terminal device, a group management server, and a network communication system that can generate or update encryption keys used to encrypt and/or decrypt information on networks such as multicast networks, as well as to a method for generating an encryption key.

2. Description of the Prior Art

As the digitization has spread in information processing and communication technologies, various electronic devices are connected to various networks and the information exchange is becoming increasingly high-speed and large-volume. Transmitting and receiving information via network communications has various advantages such as immediacy or simplicity in information exchange. However, this causes some problems such as fraudulent use or interception of information. Recently, there is an increasing need for protecting information confidentiality as a method to solve these problems. In addition, with advancement of network technologies, there is another increasing need for unicast communications such as one-to-one communications, but also multicast communications that transmit information only to the registered members as well as broadband communications that transmit information to the general public. A method for protecting information confidentiality in such multicast communications involves distributing encryption/decryption keys for encrypting/decrypting information to the members authorized to transmit and receive information that in turn encrypt/decrypt information with the encryption/decryption keys for transmission and reception of information, thereby preventing third parties from fraudulently using or intercepting such information.

On the other hand, in multicast communications, when a member is deleted from a group, it is necessary to revoke a formerly used group encryption key and generate a new group encryption key that is to be distributed to and used by the other members in the group, in order to prevent information subsequently transmitted and received in the group from being decrypted and viewed by the deleted member. At this moment, such down time will occur that encrypted communications cannot be established in the group until the new group encryption key is distributed. Thus, one of the challenges in multicast communications is to minimize such down time.

There has been proposed a prior art technology that addresses the above-mentioned challenge, as disclosed in Japanese Patent Laid-Open No. 2005-159780. This technology provides encrypted communications in such multicast communications utilizing a sub-group encryption key that is temporarily used by the remaining members so that possible down time until distribution of a new group encryption key may be eliminated in deleting members. The "sub-group encryption key" refers to a key excluding a specific node. When the number of members is N (N is any natural number), one node retains N-1 sub-group encryption keys. Upon receipt of a member deletion request, a key management server needs to generate a new group encryption key and a sub-group encryption key and distribute them to each node.

However, although the above prior art technology may eliminate the down time in deleting members, it would require a significant amount of communications in updating a group encryption key, since the key management server must distribute a new group encryption key and a sub-group encryption key to each node. Therefore, the prior art technology is not appropriate for circumstances with a limited communication bandwidth.

An object of the invention is to solve the above-mentioned problems and challenges, and in particular, to update a group encryption key with little communication in multicast by updating at each node a group encryption key for use in protecting information confidentiality (which is shared among the group), as well as to eliminate any down time that would otherwise occur in updating keys.

Besides, main stakeholders associated with the invention are members, which are defined as follows:

members: nodes that are authorized to join/leave a group and that use their terminals to encrypt/decrypt information.

SUMMARY OF THE INVENTION

A first aspect of the invention is proposed as a terminal device capable of transmitting and receiving information encrypted with other terminal devices that belong to one group.

The terminal device has:
a key storage unit storing a group encryption key and deletion keys, the group encryption key for encrypting and decrypting information transmitted and received with other terminal devices that belong to the same group, and the deletion keys corresponding to each of the other terminal devices; and
an update unit generating, if there is a leaving terminal device among the other terminal devices that belong to the group, an updated group encryption key corresponding to a new group encryption key, from the deletion key corresponding to the leaving terminal device and the group encryption key stored in the key storage unit.

A second aspect of the invention is proposed as a group management server capable of transmitting a group encryption key and deletion keys to terminal devices, the group encryption key for use in encryption of a communication with other terminal devices that belong to the group, and the deletion keys corresponding to the terminal devices that belong to the group.

The server comprises:
a key storage unit storing the deletion keys corresponding to the terminal devices that belong to the group, and the group encryption key; and
an update unit generating, if a terminal device leaves the group, an updated group encryption key corresponding to a new group encryption key, from the deletion key corresponding to the leaving terminal device and the group encryption key stored in the key storage unit.

A third aspect of the invention is proposed as a network communication system.

The network communication system has:
terminal devices belonging to a group, the terminal devices generating, if there is a leaving terminal device leaving from the group, an updated group encryption key corresponding to a new group encryption key, from a deletion key corresponding to the leaving terminal device and a group encryption key, and, after the leaving terminal device leaves the group, communicating by using the updated group encryption key; and a group management server generating the updated group encryption key corresponding to the new group encryption key from the deletion key corresponding to the leaving terminal device and the group encryption key, and, after the leaving terminal device leaves the group, communicating by using the updated group encryption key.

A fourth aspect of the invention is proposed as a method for generating an encryption key in a group including a plurality of terminal devices where a communication is encrypted with a group encryption key with other terminal devices within the group, and if there is a leaving terminal device that leaves the group, an updated group encryption key corresponding to a new group encryption key is generated.

The method for generating an encryption key has the steps of:

generating a first value from the existing group encryption key by using a predetermined function;

generating a second value from the deletion key corresponding to the leaving terminal device by using a predetermined function; and generating the updated group encryption key corresponding to a new group encryption key, from the first value and the second value by using a predetermined function.

The accompanying drawings, which are incorporated in and constitute a part of the specification, illustrate embodiments of the invention, and together with the general description given above and the detailed description of the embodiments given below, serve to explain the principles of the invention.

DESCRIPTION OF THE PREFERRED EMBODIMENTS

Embodiments according to the present invention will now be described in detail below with reference to the accompanying drawings.

[1. Exemplary System Configuration]

Figure 1:
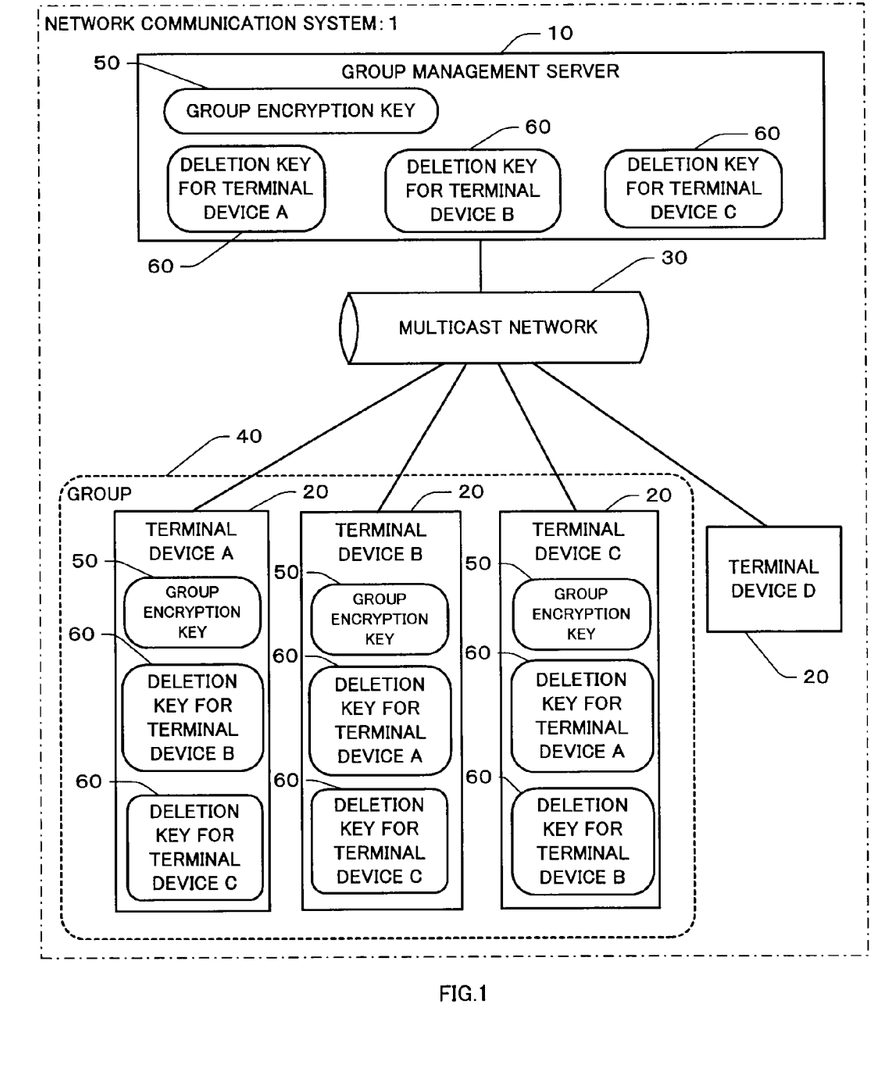
FIG. 1 is a block diagram illustrating an exemplary configuration of a network communication system wherein the invention is applied.

FIG. 1 is a block diagram illustrating an exemplary configuration of a network communication system wherein the invention is applied. The network communication system 1 has: a group management server 10; terminal devices 20 (by way of example, although four terminal devices are illustrated in FIG. 1 and labeled as "terminal device A", "terminal device B", "terminal device C", "terminal device D" to distinguish from each other, each of the terminal devices has a similar hardware configuration, and not a different configuration); and a multicast network 30.

The group management server 10 and each terminal device A-D are connected to the multicast network 30. Terminal device A, terminal device B, and terminal device C are included in a group 40 that is used for multicast communications. Multicast communications may be provided between terminal devices 20 that belong to the same group, and the user of each terminal device 20 (referred to as a "member") may allow information to be shared by each member that belongs to the group 40 through a multicast transmission to the other terminal devices 20.

In addition, each terminal device 20 has a group encryption key 50 described below and deletion keys 60 corresponding to the other terminal devices 20, respectively.

Besides, a unit of joining a group may be a terminal device 20 or a member. When the same terminal device 20 is used for a plurality of members in common, the group is managed on a member-by-member basis. That is, the deletion key 60 is generated for each member instead of each terminal device 20. Although this embodiment is herein described in the context of the terminal devices 20 subscribing and leaving the group 40 where a one-to-one correspondence exists between members and terminal devices 20, the invention is not intended to be limited to the embodiment described herein.

Terminal devices 20 that belong to the group 40 (in the depicted example, three terminals of terminal device A, terminal device B, terminal device C) have a group encryption key 50 in advance that is a common encryption key among these terminals. The group encryption key 50 refers to a secret key shared by the terminal devices 20 that belong to the group 40. When a terminal device 20 is added to, or deleted from, the group 40, and when a regular update of security-related keys is performed, a new group encryption key 50 is generated. The term "encryption key" as used herein refers to such data for controlling procedures of the encryption algorithm, corresponding to a bit sequence that can be processed by information processing devices such as computers.

The terminal devices 20 that belong to the group 40 use the group encryption key 50 to encrypt/decrypt information when communicating within the group. Alternatively, when a terminal device 20 is deleted from the group 40, each terminal device 20 generates a new group encryption key 50 using the deletion key 60 of the terminal device 20 to be deleted. Besides, in the case of FIG. 1, since terminal device D has not joined the group 40, it does not have a group encryption key 50 and a deletion key 60.

In addition, the group 40 is a receiving group where the same group encryption key is shared, and encryption/decryption of confidential information is performed for each of such groups.

The components of the network communication system 1 will now be described below.

[1.1. Group Management Server]

The group management server 10 is a server that manages a receiving group such as the group 40, e.g., using a group management table 6 and has the following functionality: generating a deletion key 60 corresponding to each of the terminal devices 20 and distributing it to a requiring terminal device 20; when a new terminal device 20 is added to the group 40, generating a different group encryption key (referred to as a "new group encryption key") for the group 40 to which the new terminal device 20 is added and distributing it to the terminal devices 20 that belong to the group 40; and when a terminal device 20 leaves the group 40, generating a different group encryption key (referred to as an "updated group encryption key") for the group 40 except for the leaving terminal device 20 and distributing it to the terminal devices 20 that belong to the group 40.

The group management server 10 is a device that comprises a central processing unit (CPU), a main memory (RAM), a read-only memory (ROM), an input/output device (I/O), and possibly an external storage device such as a hard disk device. The group management server 10 is, e.g., an information processing device such as a computer or a workstation. Stored in the above-mentioned ROM, hard disk device, etc., is a program that when loaded on a main memory and executed by the CPU causes the information processing device to function as the group management server 10, which implements the group management server 10. In addition, the program may not necessarily be stored in these storage devices within the information processing device, and it may be configured to be provided by any external device (e.g., a server in an ASP (Application Service Provider)) and loaded on the main memory.

The group management server 10 also has network communication functionality that allows transmission and reception of data to and from each terminal device 20 via the multicast network 30 according to a predetermined communication protocol.

Figure 2:
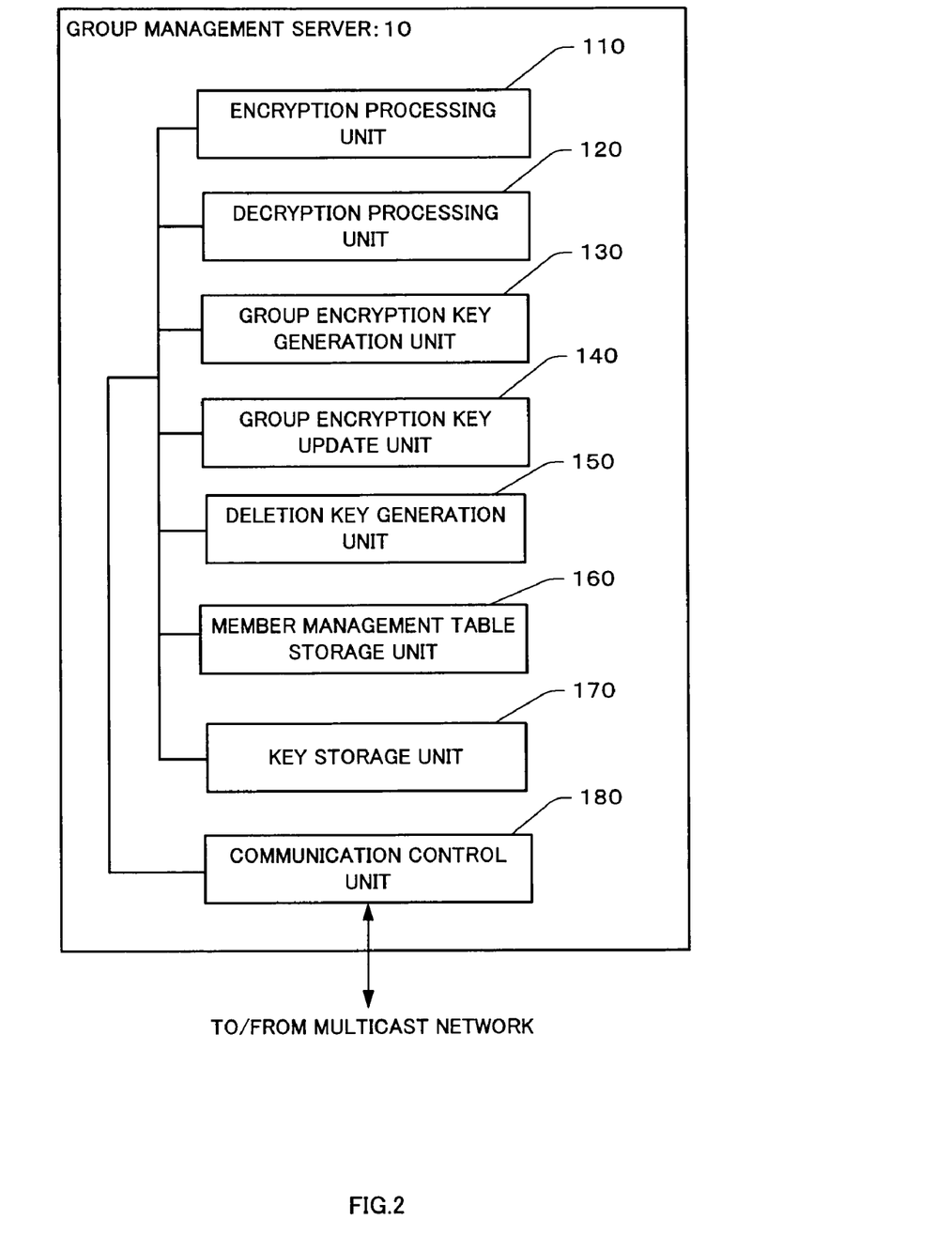
FIG. 2 is a functional block diagram illustrating an exemplary configuration of a group management server.

FIG. 2 is a functional block diagram illustrating an exemplary configuration of the group management server 10.

As illustrated, the group management server 10 has: an encryption processing unit 110; a decryption processing unit 120; a group encryption key generation unit 130; a group encryption key update unit 140; a deletion key generation unit 150; a member management table storage unit 160; a key storage unit 170; and a communication control unit 180. The group encryption key update unit 140 corresponds to an update unit included in the group management server of the invention. The key storage unit 170 corresponds to a key storage unit included in the group management server of the invention. The communication control unit 180 corresponds to a transmission unit included in the group management server of the invention. The group encryption key generation unit 130 corresponds to a first generation unit included in the group management server of the invention. The deletion key generation unit 150 corresponds to a second generation unit included in the group management server of the invention.

The communication control unit 180 is connected to each of the unit 110-170 as well as to the multicast network 30. The term "connected to" as used herein refers to, not only physical/electrical connections, but also a state where data may be transmitted and received.

The encryption processing unit 110 has functionality for encrypting a generated group encryption key 50 and a deletion key 60 corresponding to each of the terminal devices 20. The decryption processing unit 120 has functionality for decrypting a deletion request message received from a terminal device 20 when the deletion request message has been encrypted at, and transmitted from, the group encryption key 50.

The group encryption key generation unit 130 has functionality for generating a new group encryption key when a new member (terminal device 20) has been subscribed to the group 40.

The group encryption key update unit 140 has functionality for, upon receipt of a member deletion request message from the existing receiving group (e.g., the group 40) for deleting a terminal device 20, updating the existing group encryption key 50 to a different group encryption key (referred to as an "updated group encryption key") based on the deletion key 60 corresponding to the terminal to be deleted (referred to as the "terminal device to be deleted").

Figure 3:
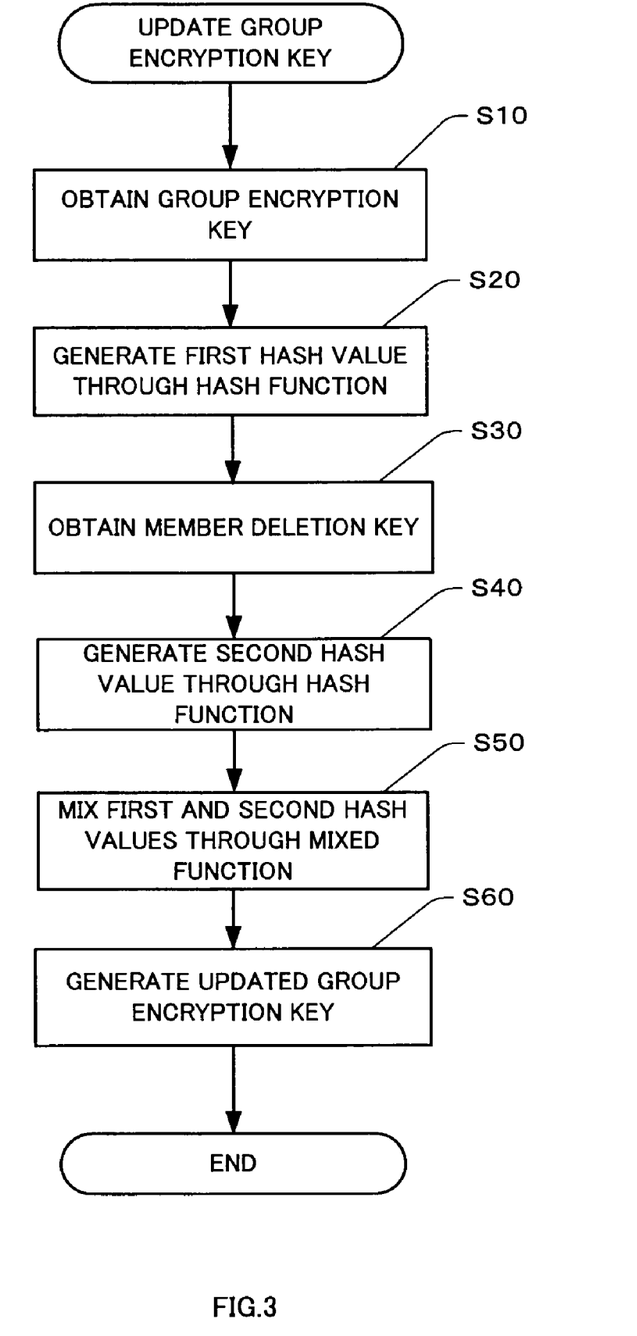
FIG. 3 is a flowchart illustrating an example of a method for generating an updated group encryption key performed by a group encryption key update unit.

FIG. 3 is a flowchart illustrating an example of a method for generating an updated group encryption key performed by the group encryption key update unit 140. Using a function such as a hash function or a mixed function, the group encryption key update unit 140 generates a new group encryption key, i.e., an updated group encryption key, from the current group encryption key, i.e., the last generated group encryption key 50 of the group encryption keys that have previously generated and stored (including new group encryption keys 50 and updated group encryption keys 50).

An example of a method for generating an updated group encryption key will now be specifically described below with reference to FIG. 3.

Firstly, the group encryption key update unit 140 obtains a current group encryption key 50 from the key storage unit 170 (S10). Then, the group encryption key update unit 140 generates a hash value (a first hash value) from the group encryption key 50 through a hash function (S20). Then, the group encryption key update unit 140 obtains a deletion key 60 corresponding to the terminal device 20 to be deleted from the key storage unit 170 (S30). Then, the group encryption key update unit 140 generates a hash value (a second hash value) from the deletion key 60 through the hash function (S40).

Then, the group encryption key update unit 140 generates a certain output using the first hash value and the second hash value through a predetermined mixed function (S50). The term "mixed function" as used herein refers to a function for generating one output value from two input values wherein one specific output may be determined whenever two input values are determined. For example, such functions may be used as a mixed function described herein that performs a method for computing the XOR of two values. The output of the mixed function becomes an updated group encryption key 50, which is stored by the key storage unit 170 (S60). Thereafter, the operation of updating group encryption keys performed by the group encryption key update unit 140 is terminated.

The deletion key generation unit 150 has functionality for generating a deletion key 60 corresponding to the newly added terminal device 20 when a new terminal device 20 is added to a receiving group such as the group 40. The deletion key 60 includes, for example, data and a bit sequence with one-to-one correspondence to each of the terminal devices 20.

Figure 4:
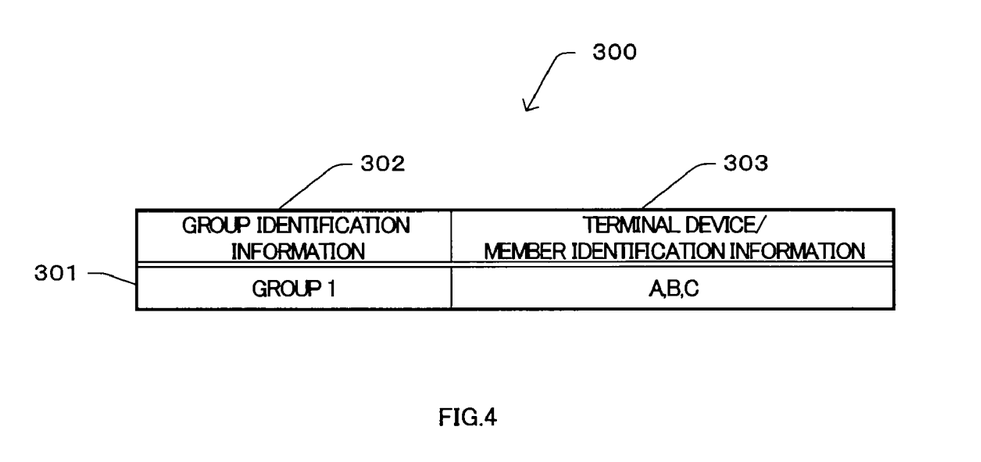
FIG. 4 is a diagram illustrating an exemplary data configuration of a member management table.

The member management table storage unit 160 has functionality for storing a member management table, in which the group 40 that is to be managed by the group management server 10 and each of the terminal devices 20 that belong to a respective group 40 are described in association with each other. FIG. 4 is a diagram illustrating an exemplary data configuration of a member management table. In the depicted example, the member management table 300 has one record 301 for each group 40 managed by the group management server 10. Each record 301 has a group identification information field 302 for storing group identification information to identify groups 40 and a terminal device/member identification information field 303 for storing terminal device/member identification information to identify the terminal devices 20 (or members) that belong to a group 40. In the case of FIG. 3, it is described in the member management table 300 that only "Group 1" is to be managed by the group management server 10 and that the terminal devices 20 that belong to the "Group 1" are three terminal devices A, B, C (three persons).

Returning to FIG. 2, the exemplary configuration of the group management server 10 will further be described below.

The key storage unit 170 has functionality for storing a new group encryption key 50 generated by the group encryption key generation unit 130 or an updated group encryption key 50 generated by the group encryption key update unit 140, as well as a deletion key 60 generated by the deletion key generation unit 150.

The communication control unit 180 has functionality for transmitting and receiving data, such as a message, a group encryption key 50, or a deletion key 60, to and from terminal device 20 via the multicast network 30. For example, the communication control unit 180 includes a network card or a network board that is configured by a microcomputer that performs a protocol stack, a signal generation circuit that converts generated data to electrical signals, etc.

[1.2. Terminal Devices]

Description is now made to the terminal devices 20. The terminal devices 20 are used by members to exchange data with the other terminal devices 20 that belong to the same group 40 through the network communication system 1 according to the invention.

The terminal devices 20 are devices that comprise a central processing unit (CPU), a main memory (RAM), a read-only memory (ROM), an input/output device (I/O), and possibly an external storage device such as a hard disk device. The terminal devices 20 are, e.g., information processing devices such as personal computers with network communication functionality, PDAs (Personal Data Assistants), portable phones, or portable gaming devices. Stored in the above-mentioned ROM, hard disk device, etc., is a program that causes the information processing device to function as the terminal device 20 or to execute a method for updating an encryption key. When the program is loaded on the main memory and executed by the CPU, each of the terminal devices 20 is implemented or the method for updating an encryption key is executed.

Each of the terminal devices 20 also has network communication functionality that allows transmission and reception of data to and from each of the other terminal devices 20 via the multicast network 30 according to a predetermined communication protocol.

Figure 5:
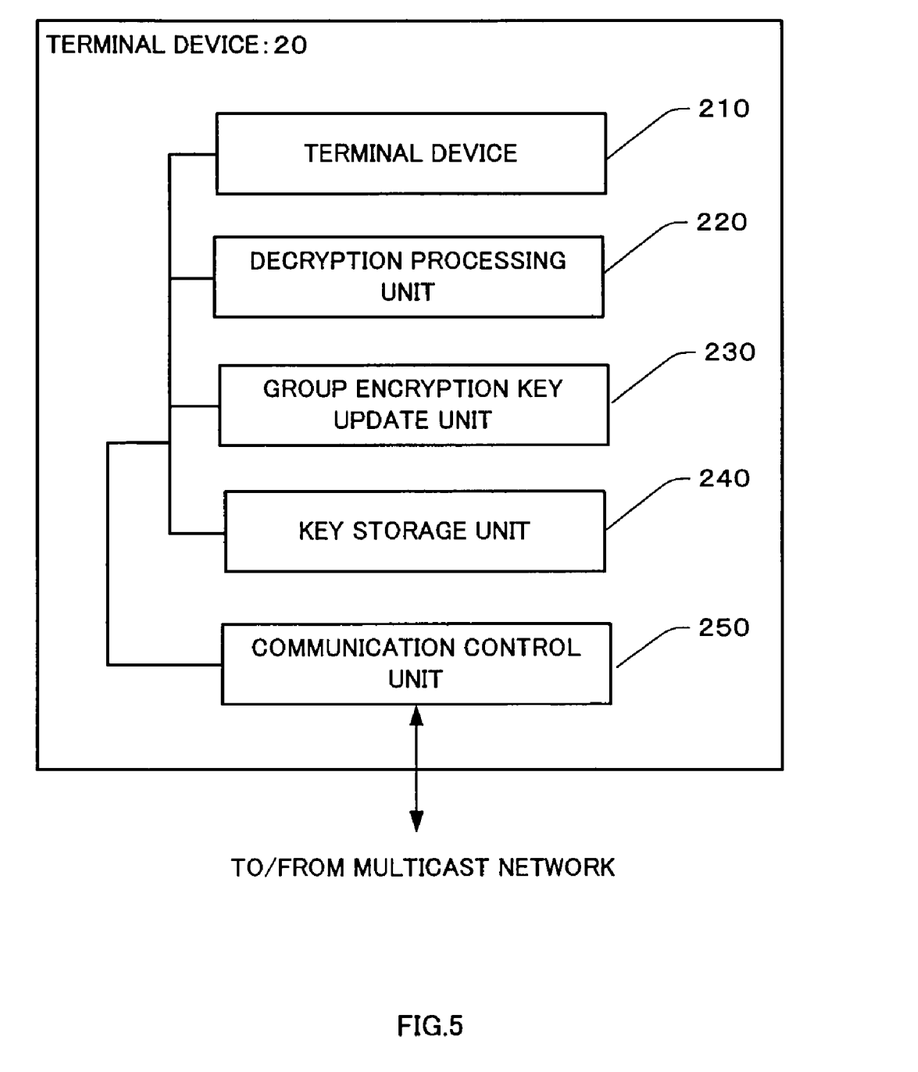
FIG. 5 is a functional block diagram illustrating an exemplary configuration of a terminal device.

FIG. 5 is a functional block diagram illustrating an exemplary configuration of a terminal device 20. The terminal device 20 has: an encryption processing unit 210 that encrypts information intended for the other terminal devices 20 that belong to a group 40; a decryption processing unit 220 that decrypts the encrypted information, which is also transmitted to the group 40; a group encryption key update unit 230 that, upon receipt of a message from a group management server 10 for deleting any of the terminal devices 20 from the group 40, generates a new, updated group encryption key 50 based on a deletion key 60 corresponding to the terminal device 20 to be deleted; a key storage unit 240 that stores a group encryption key 50 and deletion keys 60 corresponding to the other terminal devices 20 that belong to the same group 40 as itself; and a communication control unit 250 that is connected to each of the units 210 to 240 and the multicast network 30. The group encryption key update unit 230 corresponds to the update unit included in the terminal device of the invention. The key storage unit 240 corresponds to the key storage unit included in the terminal device of the invention.

At this moment, the group encryption key update unit 230 of the terminal device 20 performs the same method for generating an updated group encryption key as described above for the group encryption key update unit 140 of the group management server 10 (see FIG. 3). Accordingly, as long as the same group encryption key 50 and deletion key 60 are used by each device, the group management server 10 and all terminal devices 20 generate the same updated group encryption key 50.

[1.3. Multicast Network]

Returning to FIG. 1, the components of the network communication system 1 will further be described below.

The multicast network 30 is a network where multicast addresses that are transmitted to a plurality of specific members are available. The multicast network 30 may set how to generate, delete, and update a multicast group.

This is the end of explanation about the components of the network communication system 1.

[2. Exemplary Operations of Network Communication System]

Description is now made to exemplary operations of the network communication system 1, and in particular, those for generating a new group encryption key 50 and an updated group encryption key 50 at the network communication system 1.

[2.1. Generation of Updated Group Encryption Key (Deletion of Members)]

Figure 6:
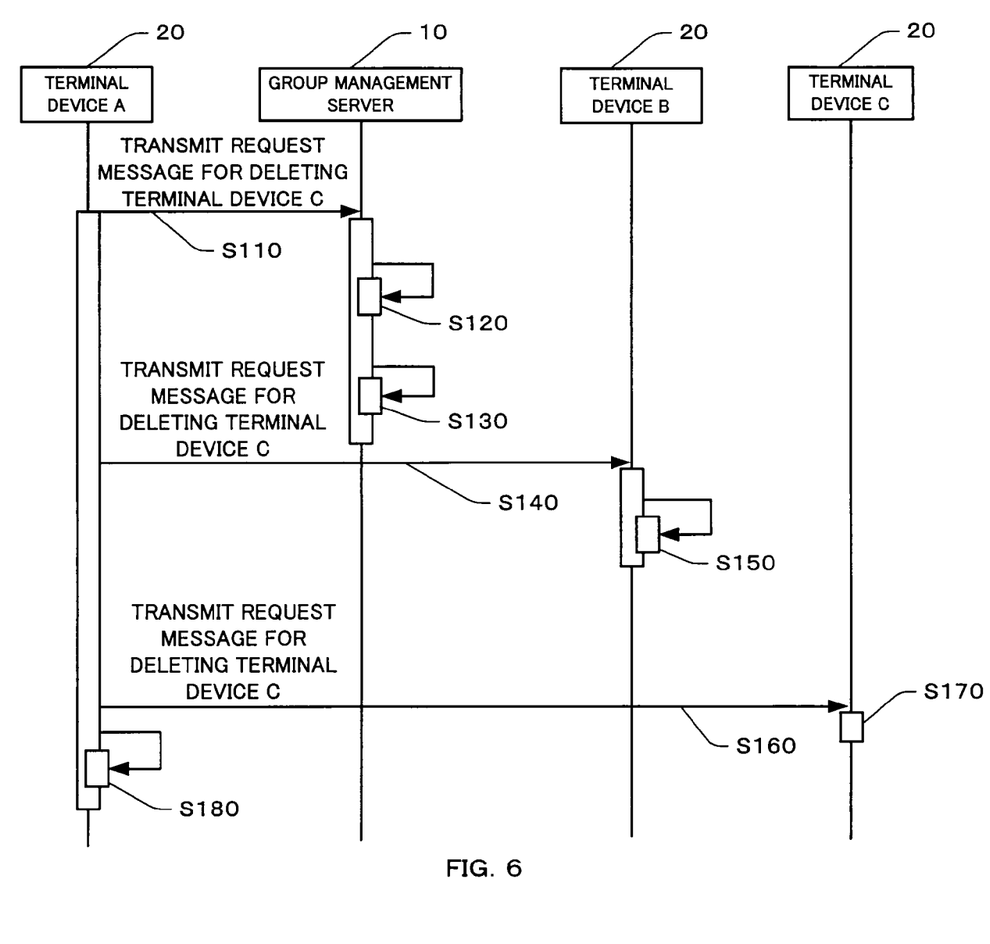
FIG. 6 is a sequence diagram illustrating exemplary operations of the network communication system.

FIG. 6 is a sequence diagram illustrating exemplary operations of the network communication system 1, more specifically, exemplary operations performed when an updated group encryption key 50 is generated at the network communication system 1. In this case, the group management server 10 manages a group 40 including three terminal devices 20 (in this case, terminal device A, terminal device B, terminal device C). It is assumed here that one of the terminal devices 20 (in this case, terminal device C) leaves the group 40. It is also assumed that terminal device A has admin privileges for the group 40. That is, terminal device A is authorized to request subscription and deletion of a new member to and from the group management server 10, which will in turn, on request from terminal device A with the admin privileges, update the member management table 300, generate and distribute a new group encryption key 50, generate/delete a deletion key 60, generate and distribute an updated group encryption key 50, and so on.

Firstly, terminal device A multicasts a deletion request message for deleting terminal device C to the group management server 10 and the other terminal devices B and C that belong to the group 40 (S110, S140, S160). In this case, a member using terminal device A may be an admin member with specific privileges, or alternatively, a member may be added/deleted by all members that belong to the group 40. It is assumed that assignment of privileges may be set according to the operation.

Meanwhile, the group management server 10 that has received the deletion request message from terminal device A for deleting terminal device C updates member management information in the group management table 300 stored in the member management table storage unit 160 and modifies the member management information to delete terminal device C from the group 40 (S120). Then, the group management server 10 generates an updated group encryption key 50 via the group encryption key update unit 140, using a deletion key 60 corresponding to terminal device C that is retained at its key storage unit 170 and the current group encryption key 50 as inputs, and causes the key storage unit 170 to store the updated group encryption key 50 (S130).

Similarly, terminal device B that has received a deletion request message for deleting terminal device C (see S140) generates an updated group encryption key 50 via the group encryption key update unit 230, using the deletion key 60 corresponding to terminal device C that is retained at its key storage unit 240 and the current group encryption key 50 as inputs, and causes the key storage unit 170 to store the updated group encryption key 50 (S150).

Although terminal device C to be deleted also receives the deletion request message (S160) since the deletion request message for deleting terminal device C from terminal device A is transmitted over multicast, it cannot generate an updated group encryption key 50 (S170) because its own deletion key 60 corresponding to terminal device C is not stored therein. Consequently, after the transmission of the deletion request message, the information encrypted with the updated group encryption key 50 between the terminal devices 20 that belong to the group 40 (in this case, terminal devices A and B) and the group management server 10 cannot be decrypted at terminal device C, and hence the information within the group 40 cannot be viewed at terminal device C.

Besides, terminal device A also generates an updated group encryption key 50 via the group encryption key update unit 230, using the deletion key 60 corresponding to terminal device C that is retained at its key storage unit 240 and the current group encryption key 50 as inputs, and causes the key storage unit 170 to store the updated group encryption key 50 (S180). Thus, all terminal devices 20 that belong to the group and the group management server 10 have the same updated group encryption key 50 that corresponds to the encryption key obtained after terminal device C left the group.

[2.2. Generation of New Group Encryption Key (Addition of Members)]

Description is now made to operations for a group encryption key 50 when a new terminal device 20 is added to a group 40.

Figure 7:
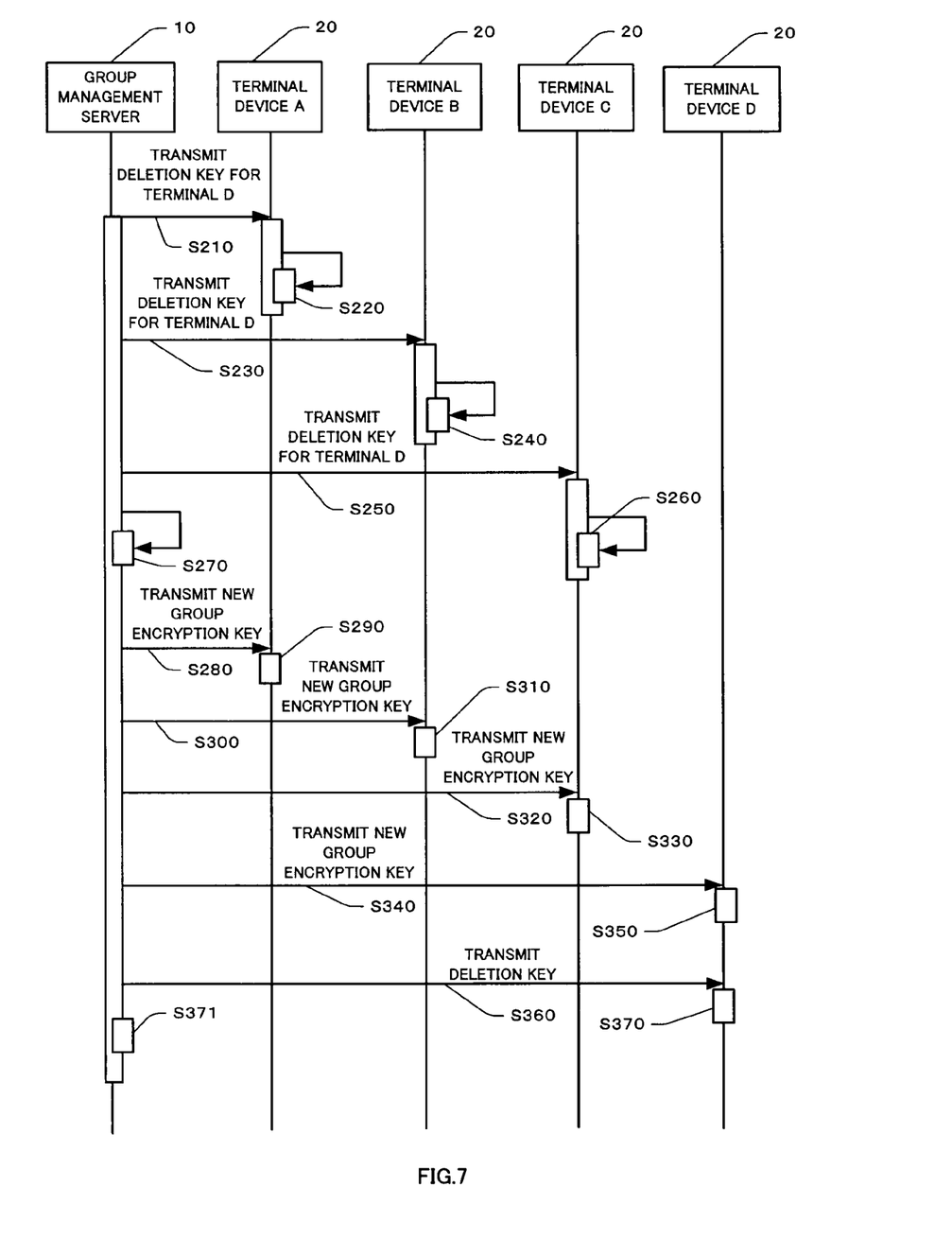
FIG. 7 is a sequence diagram illustrating exemplary operations of the network communication system.

FIG. 7 is a sequence diagram illustrating exemplary operations of the network communication system 1, more specifically, exemplary operations performed when a new group encryption key 50 is generated at the network communication system 1. In this case, the group management server 10 manages a group 40 of members including three terminal devices 20 (in this case, terminal device A, terminal device B, terminal device C). It is assumed here that a new terminal device 20 (in this case, terminal device D) is subscribed to the group 40.

Terminal device D that is newly subscribed to the group 40 performs a predetermined authorization process (such as a group subscription process) through communications with the group management server 10 (not illustrated).

Upon completion of the authorization process, the group management server 10 generates, via the deletion key generation unit 150, a deletion key 60 corresponding to terminal device D that cannot be known by terminal device D (not illustrated), encrypts the deletion key 60 corresponding to terminal device D via the encryption processing unit 110, and multicasts it to the terminal devices 20 that have previously belonged to the group 40 (in this case, terminal device A, terminal device B, terminal device C) (S210, S230, S250). Besides, in this case, the existing group encryption key 50 is used for encryption of the deletion key.

Each of terminal device A, terminal device B, terminal device C, which has received the deletion key 60 corresponding to terminal device D, decrypts the deletion key 60 corresponding to terminal device D that has been encrypted with the decryption processing unit 120 and obtains the deletion key 60 corresponding to terminal device D, respectively (S220, S240, S260). Each of terminal devices A, B, C, which has obtained the deletion key 60 corresponding to terminal device D through the decryption process, causes the respective key storage unit 170 to store the deletion key 60 corresponding to terminal device D.

Then, via the group encryption key generation unit 130, the group management server 10 generates a new group encryption key 50 corresponding to the group 40 to which terminal device D is added (S270).

Then, via the encryption processing unit 110, the group management server 10 decrypts the new group encryption key 50 with the existing group encryption key 50 (which is the group encryption key generated immediately before the new group encryption key) and multicasts it to the terminal devices 20 in the group 40 of receiving group (in this case, terminal device A, terminal device B, terminal device C, terminal device D) (S280, S300, S320).

Each of all terminal devices 20, except for the newly-subscribed terminal device D, that have received the new group encryption key 50 encrypted with the existing group encryption key 50, i.e., each of terminal devices A, B, C obtains the new group encryption key 50 via the decryption processing unit 120 and causes the respective key storage unit 170 to store the new group encryption key 50, respectively. This allows each of all terminal devices 20 (terminal devices A, B, C) except for the newly-subscribed terminal device D to subsequently transmit and receive data through encryption/decryption via the new group encryption key 50.

On the other hand, the group management server 10 uses the Diff-Hellman algorithm, etc., to share a session key with terminal device D that is newly subscribed to the group 40 (not illustrated). Then, the group management server 10 uses the session key to encrypt the new group encryption key 50 via the encryption processing unit 210 and transmits it to terminal device D (S340). Then, terminal device D that has received the encrypted new group encryption key 50 decrypts, via its decryption processing unit 220, the new group encryption key 50 encrypted with the session key and obtains the new group encryption key 50 (S350). The obtained new group encryption key 50 is stored in the key storage unit 240 of terminal device D.

Then, the group management server 10 encrypts a deletion key 60 corresponding to each of all terminal devices 20 except for the newly-subscribed terminal device D, i.e., each of terminal device A, terminal device B, terminal device C, with the above-mentioned session key and transmits the encrypted deletion keys 60 to terminal device D (S360). Then, terminal device D that has received the encrypted deletion keys 60 decrypts, via its decryption processing unit 220, the deletion keys 60 encrypted with the session key and obtains the deletion keys 60 (S370). In this case, the obtained deletion keys 60 do not include the deletion key 60 corresponding to terminal device D. The obtained deletion keys 60 are stored in the key storage unit 240 of terminal device D. The group management server 10 updates member management information in the group management table 300 stored in the member management table storage unit 60 and modifies the member management information to add terminal device D to the group 40 (S371).

In this way, each of all terminal devices 20 that belong to the group, i.e., each of terminal device A, terminal device B, terminal device C, terminal device D, has obtained the new group encryption key 50 and the deletion keys 60 corresponding to all of the other terminal devices 20.

[3. Conclusion]

According to the invention, group encryption keys may be updated with little communication in multicast by updating at each node a group encryption key for used in protecting information confidentiality (which is shared among the group). In addition, it is possible to eliminate any down time that would otherwise occur in updating keys, while minimizing the amount of communications.

Further, according to the invention, if there is only a limited communication bandwidth, or even if frequent deletion of members may occur, encryption keys may be updated in real time.

According to the invention, in protecting information confidentiality on multicast networks, a new group encryption key may be generated on a node-by-node basis with little communication when a receiving member leaves the group. Therefore, any down time that would occur in deletion of members may be eliminated.

Additional advantages and modifications will readily occur to those skilled in the art. Therefore, the invention in its broader aspects is not limited to the specific details or representative embodiments shown and described herein. Accordingly, various modification may be made without departing from the spirit or scope of the general inventive concept as defined by the appended claims and their equivalents.

What is claimed is:

1. A terminal device capable of transmitting and receiving information encrypted with other terminal devices that belong to one group, comprising:
    a key storage unit storing a group encryption key and deletion keys, the group encryption key for encrypting and decrypting information transmitted and received with other terminal devices that belong to the group, and the deletion keys corresponding to each of the other terminal devices; and
    an update unit generating, if there is a leaving terminal device among the other terminal devices that belong to the group, an updated group encryption key corresponding to a new group encryption key, from the deletion key corresponding to the leaving terminal device and the group encryption key stored in the key storage unit.

2. The terminal device according to claim 1, wherein:
    the update unit generates a first value from the existing group encryption key by using a predetermined function, generates a second value from the deletion key corresponding to the leaving terminal device by using a predetermined function, and generates the updated group encryption key from the first value and the second value by using a predetermined function.

3. A group management server capable of transmitting a group encryption key and deletion keys to terminal devices, the group encryption key for use in encryption of a communication with other terminal devices that belong to the group, and the deletion keys corresponding to the terminal devices that belong to the group, the server comprising:
    a key storage unit storing the deletion keys corresponding to the terminal devices that belong to the group, and the group encryption key; and
    an update unit generating, if a terminal device leaves the group, an updated group encryption key corresponding to a new group encryption key, from the deletion key corresponding to the leaving terminal device and the group encryption key stored in the key storage unit.

4. The server according to claim 3, wherein:
    the update unit generates a first value from the existing group encryption key by using a predetermined function, generates a second value from the deletion key corresponding to the leaving terminal device by using a predetermined function, and generates the updated group encryption key from the first value and the second value by using a predetermined function.

5. The server according to claim 4, wherein:
    the server further has a transmission unit transmitting to the terminal devices a new group encryption key generated upon subscription of a new terminal device to the group and a deletion key for the new terminal device, and
    the transmission unit does not transmit the updated group encryption key to any of the terminal devices.

6. The server according to claim 5, further comprising:
    a first generation unit generating a new group encryption key when a new terminal device is subscribed to the group; and
    a second generation unit generating a deletion key corresponding to that terminal device when a new terminal device is subscribed to the group.

7. A network communication system comprising:
    terminal devices belonging to a group, the terminal devices generating, if there is a leaving terminal device leaving from the group, an updated group encryption key corresponding to a new group encryption key, from a deletion key corresponding to the leaving terminal device and a group encryption key, and, after the leaving terminal device leaves the group, communicating by using the updated group encryption key; and
    a group management server generating the updated group encryption key corresponding to the new group encryption key from the deletion key corresponding to the leaving terminal device and the group encryption key, and, after the leaving terminal device leaves the group, communicating by using the updated group encryption key.

8. The network communication system according to claim 7, wherein:
    each of the terminal devices and the group management server generate a first value from the existing group encryption key by using a predetermined function, generates a second value from a deletion key corresponding to the leaving terminal device by using a predetermined function, and generate a updated group encryption key corresponding to a new group encryption key from the first value and the second value by using a predetermined function.

9. A method for generating an encryption key in a group including a plurality of terminal devices where a communication is encrypted with a group encryption key with other terminal devices within the group, and if there is a leaving terminal device that leaves the group, an updated group encryption key corresponding to a new group encryption key is generated, the method comprising the steps of:
    generating a first value from the existing group encryption key by using a predetermined function;
    generating a second value from the deletion key corresponding to the leaving terminal device by using a predetermined function; and
    generating the updated group encryption key corresponding to a new group encryption key, from the first value and the second value by using a predetermined function.

* * * * *